United States Patent [19]

Acampora et al.

[11] 4,425,639

[45] Jan. 10, 1984

[54] SATELLITE COMMUNICATIONS SYSTEM WITH FREQUENCY CHANNELIZED BEAMS

[75] Inventors: Anthony Acampora, Freehold; Douglas O. Reudink, Sea Girt; Yu S. Yeh, Freehold Township, Monmouth County, all of N.J.

[73] Assignee: Bell Telephone Laboratories, Incorporated, Murray Hill, N.J.

[21] Appl. No.: 224,006

[22] Filed: Jan. 12, 1981

[51] Int. Cl.$^3$ .......................... H04J 4/00; H04B 7/185
[52] U.S. Cl. ......................... 370/50; 370/75; 370/95; 370/97; 455/12; 455/17; 455/25
[58] Field of Search ...................... 455/12, 13, 17, 25; 343/100 ST; 375/3, 4; 370/50, 75, 95, 97, 104

[56] References Cited

U.S. PATENT DOCUMENTS

| | | | |
|---|---|---|---|
| 3,789,142 | 1/1974 | Shimasaki et al. | 370/104 |
| 4,105,973 | 8/1978 | Arnold et al. | 370/104 |
| 4,145,573 | 3/1979 | Arnold | 370/104 |
| 4,215,348 | 7/1980 | Cordaro et al. | 370/104 |
| 4,259,741 | 3/1981 | Kawai | 370/75 |

OTHER PUBLICATIONS

"The 30/20 GHz Mixed User Architecture Development Study: Executive Summary", pp. 0-1 to 0-21, TRW, Inc., Redondo Beach, Calif., Space Systems Div., Sep. 1979.
"Communications Satellite Developments: System" pp. 139-154, Gilbert E. Lavean et al., Progress in Astronautics and Aeronautics, vol. 41, Apr. 1974.
"An Advanced Mixed User Domestic Satellite System Architecture"-pp. 148-153, 8th AIAA Satellite Conf., Orlando, Fla., 1980.

*Primary Examiner*—Marc E. Bookbinder
*Attorney, Agent, or Firm*—Volker R. Ulbrich

[57] ABSTRACT

A digital communications satellite (12,44) receives signals from a plurality of narrow input spot-beams (14) of an uplink. It regenerates, multiplexes and routes the signals for transmission in a plurality of narrow output spot-beams (42) of a downlink. The uplink beams (14) each include a plurality of frequency re-use channels (18), while the downlink beams (42) each have only a single wide-band channel. The satellite (12,44) may multiplex the signals either before or after routing them. The spot-beams (14,42) may be fixed or scanning.

5 Claims, 2 Drawing Figures

SATELLITE COMMUNICATIONS SYSTEM WITH FREQUENCY CHANNELIZED BEAMS

BACKGROUND OF THE INVENTION

The invention relates to digital satellite communication systems with time-division multiple access for frequency re-use multiple spot-beam uplinks, an on-board satellite routing switch, and multiple spot-beam downlinks.

Among the more promising future satellite communications systems are those which will serve a large number of earth stations by a type of time-division multiple access transmission in which the uplink and the downlink each comprise a plurality of narrow spot-beams which may be frequency-channelized. Such spot-beams permit the re-use of the allocated frequency band by angular distribution of the individual beams to provide mutual spatial isolation of their signals. The signals are in digitally encoded burst form, and the routing of the uplink signals to their intended downlink location is done on-board the satellite by means of an electronic digital routing switch which processes the signals before they go to the transmitter for the downlink transmission. The satellite may also be capable of on-board regeneration of the signals and the individual transponders may include a variable antenna pointing, or spot-beam scanning feature.

While the satellites of such a system are themselves costly elements, as the traffic handling capability of the satellites become greatly increased, the number of earth stations served by a satellite becomes so large that the earth stations also become a very significant factor in the cost of the entire system. The earth stations must have a highly sensitive receiver to reliably receive the often very weak downlink signals and must also have strong transmitters with multiple frequency channel transmitting capability at a power level sufficient to reliably transmit the signals to the satellite.

It is generally recognized that from the standpoint of reducing the cost of the satellite, it is desirable to reduce the number of downlink transmitters, since each one requires an antenna port and a traveling wave tube. The traveling wave tube is relatively bulky and heavy. The number of transmitters can, of course, be reduced by minimizing the number of frequency-divided channels.

In one approach this is achieved by having a single wideband transmitter for each of the spot-beams, with no frequency-divided channels in the uplink or downlink beams. However, such an arrangement places a burden on the earth stations. Two factors enter into this. First, the transmission rate for such an arrangement is very high—from 600 to 800 Mb/sec. (million bits per second), if quadriphase modulation is employed. The second, and more important consideration is that to maintain the same energy per bit and bit error rate performance, each ground station must be equipped with a transmitter capable of providing perhaps 10 dB (decibels) more power, although at only 1/10 the duty cycle, as compared to a system employing 10 to 1 channelization.

SUMMARY OF THE INVENTION

With the novel satellite communication system in accordance with the present invention, the uplink spot-beams are frequency-channelized into a plurality of equal capacity channels and the downlink spot-beams each have their channels concentrated into a lesser number of higher bit-rate wider bandwidth transmission channel. Preferably, each downlink beam is a single wideband channel. This requires a large number of uplink receivers at the satellite, but maintains a highly desirable single transmitter-per-beam downlink arrangement. A routing switch having a plurality of input and output terminals can be reconfigured on a dynamic basis to assign the traffic to appropriate time slots and channels in accordance with the instantaneous signal traffic demand for the satellite without storage and in such a manner that none of the ground stations needs to transmit simultaneously on two or more channels. Furthermore, in some instances frequency hopping is not required, and the overall transmitter utilization efficiency is as high as is achievable for a single wideband transmitter.

The invention is also applicable to multiple scanning beam systems. Although for such a system an efficient traffic assignment is possible, frequency hopping may be required for the ground stations in order to prevent undue degradation of blocking probability.

DESCRIPTION OF THE PREFERRED EMBODIMENT STRUCTURE

Figure 1:
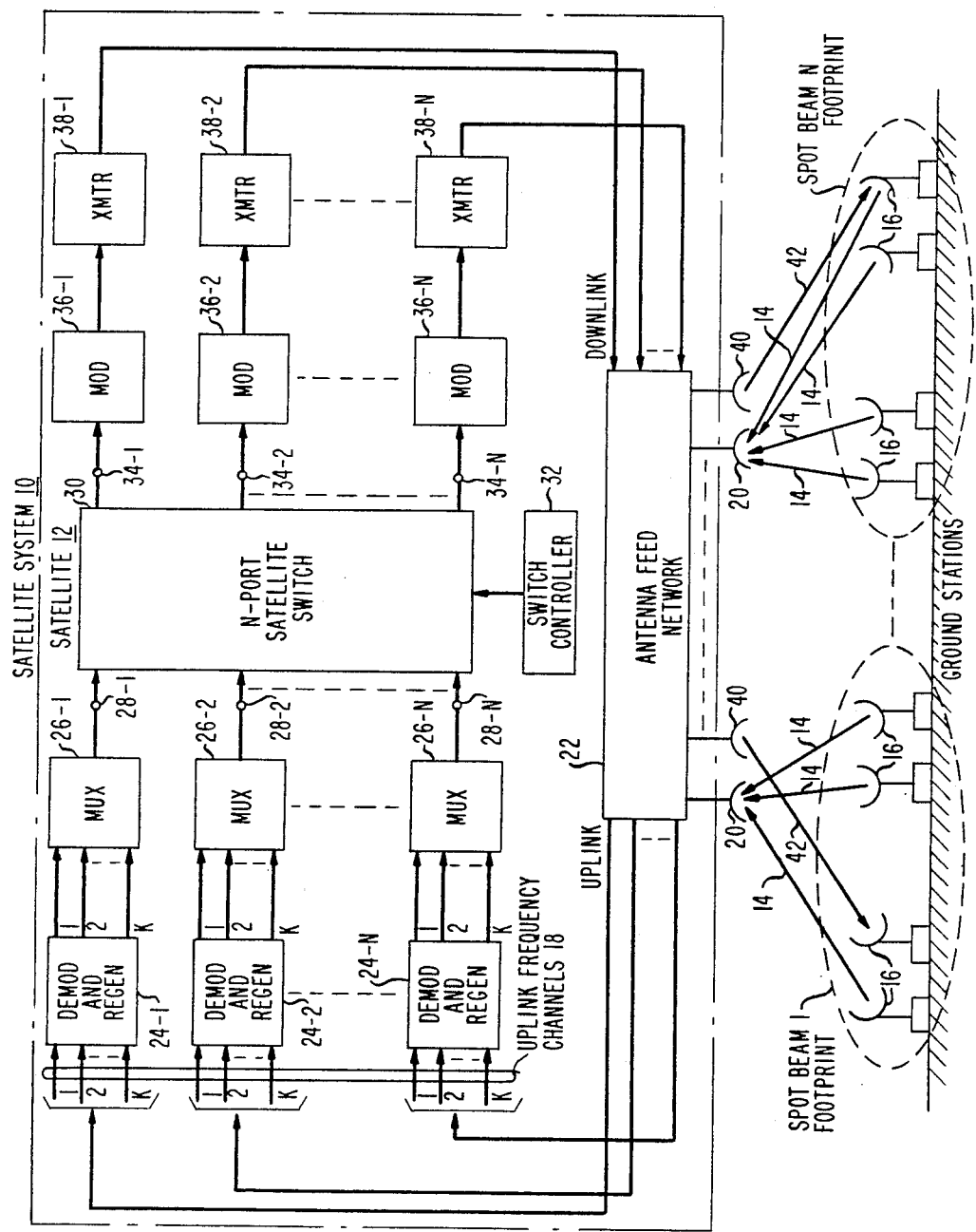
FIG. 1 is a schematic diagram illustrating in block form the major signal processing elements of a satellite communications system in accordance with the preferred embodiment of the present invention for fixed spot-beam operation and in which the signal is multiplexed between reception and routing.

In the satellite system 10 of FIG. 1, a fixed beam satellite 12 is addressed by a number N of uplink spot-beams 14, each being accessed at any given time by a maximum of K ground stations 16. Hereinafter K is chosen K=8 for purposes of illustration. Each of the uplink spot-beams 14 consists of eight frequency-divided uplink frequency channels 18 which are received by N uplink antennas 20 at the satellite 12 on a time-division multiple access basis and led from an antenna feed network 22 to a signal demodulator and regenerator 24. The regenerated signals, which are now at baseband frequency, pass to a multiplexer 26 which converts the signals of each spot-beam to a single, high-speed, serial uplink channel fed to the N input terminals 28 of an electronic routing switch 30 controlled by a switch controller 32. The routed signals from N output terminals 34 of the routing switch 30 are fed to a modulator 36 and a transmitter 38 and then passed to the antenna feed network 22 for downlink transmission to receiving ground stations 16 from N downlink antennas 40 as a single, broadband high-speed serial downlink frequency channel for each downlink spot-beam 42.

Figure 2:
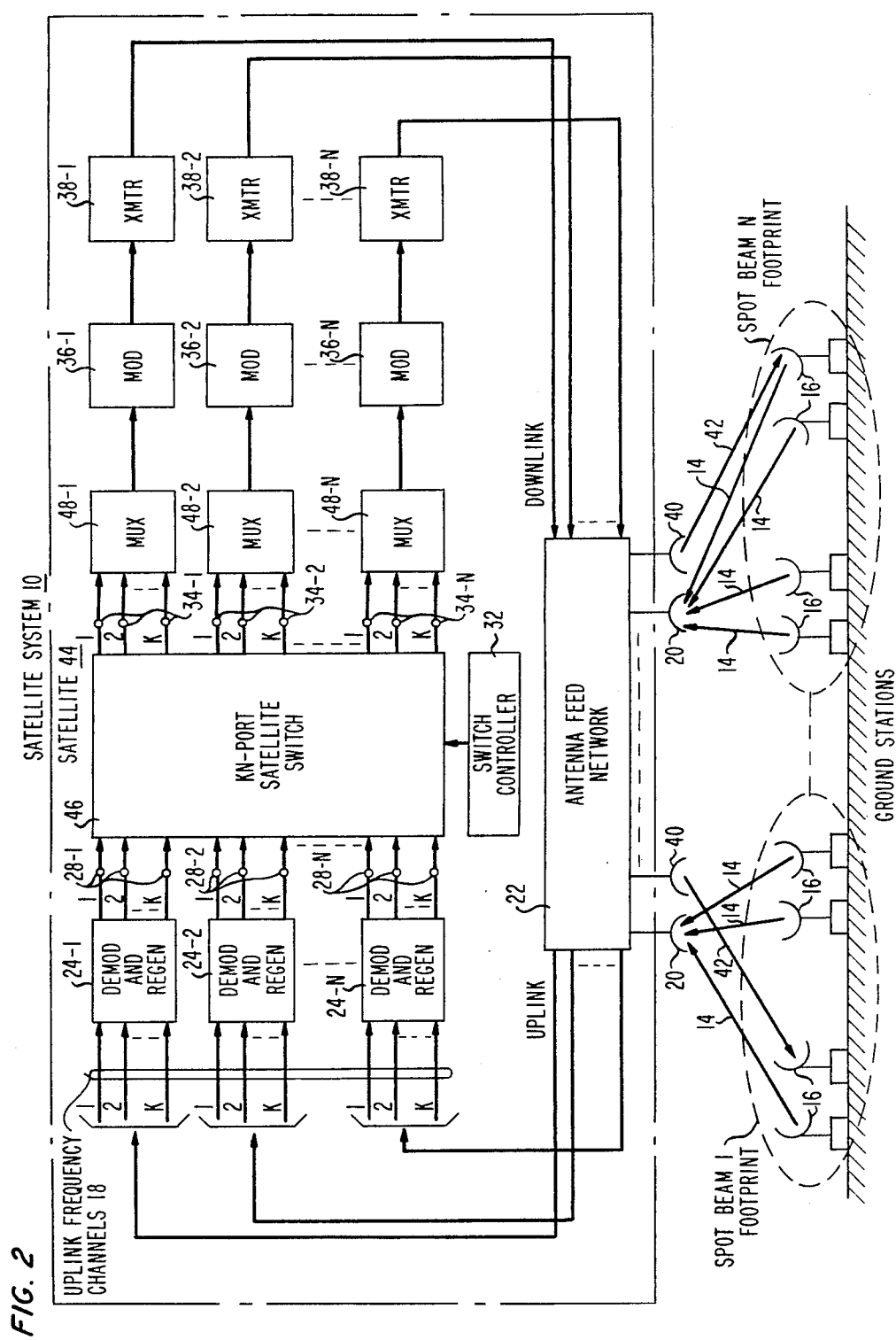
FIG. 2 is a schematic diagram illustrating in block form the major signal processing elements of a satellite communications system in accordance with another preferred embodiment of the present invention in which the signal is multiplexed after being routed.

An alternative satellite 44 for the satellite system 10 is shown in the FIG. 2. Elements of the satellite 44 which correspond to similar elements of the satellite 12 are designated by like reference numerals. The satellite 44 differs from the satellite 12 of FIG. 1 in that the demodulated and regenerated uplink signals of the total eight N uplink channels 18 go directly to the eight N input terminals 28 of the routing switch 46, which also has eight N output terminals 34. The signals from the output terminals 34 of the switch 46 are then converted to N high-speed serial signals by multiplexers 48 for modulation and transmission in the downlink spot-beams 42. Although the routing switch 46 of the satellite 44 requires eight times the number of input ports 28 and output ports 34 as compared to the routing switch 30 of the satellite 12, this arrangement leads to a more efficient use of the available transmission bandwidth by permitting the use of scanning spot-beams.

GENERAL CONSIDERATIONS

The uplink channelization results in significant power savings at the ground stations 16, since the required power is reduced by a factor equal to the number of channels. However, the ground stations 16 which transmit to the satellites 12,44 described above are restricted in that at any point in time the uplink communications from any given ground station 16 can occur on one channel only; that is, no ground stations 16 can simultaneously transmit on two or more channels. This restriction avoids the need to employ more than one transmitter or the need to back a single ground station 16 transmitter out of saturation to accommodate the amplitude-varying envelope of a signal comprising two or more channels. Such measures would tend to negate the uplink advantages of channelization. This restriction also limits both the trunking efficiency and the flexibility of dynamic resource allocation when compared to single high-speed wideband channel operation. However, as will be discussed, this unfavorable impact can often be reduced to an insignificant magnitude.

While the satellites 12,44 of the satellite commuications system 10 as described above have only a single wideband channel in the downlink, it is within the scope of the present invention to have more than one channel in the downlink beam, so long as there are a lesser number of channels in the downlink beams than there are in the uplink beams. The lesser number of downlink channels permit a reduced number of transmitters on-board the satellite. The most advantageous arrangement, however, appears to be one in which there is only a single channel in each downlink spot-beam.

The satellite communications system 10 described above involves bit detection, regeneration and multiplexing on-board the satellites 12,44. On-board regeneration improves the downlink performance by eliminating uplink noise. More importantly, it also eliminates the distortion of the signal caused by the receiver filters and by non-linearities in the satellite transmitters 38. It is also noted that on-board regeneration offers a significant reduction in the uplink transmitter power. Nonregenerative satellite systems typically have the ground station transmitted power at such a level that the uplink SNR (Signal-to-Noise Ratio) is 10 dB (decibel) higher than the downlink SNR. The primary reason is to insure a negligible noise contribution from the uplink into the downlink. For a regenerative repeater, a condition in which an uplink SNR is a few decibels larger than the downlink SNR will insure a negligible contribution to the BER (Bit Error Rate). Since the satellite noise figure is typically a few decibels worse than that of the ground stations 16, additional ground station 16 power is required to make up this difference. Reductions in ground station 16 transmitter powers of 5–10 dB compared to a nonregenerative satellite can be expected. This power savings is independent of channelization.

The satellite system 10 can have either fixed or multiple scanning spot-beams. A multiple scanning beam system provides flexibility in matching the resources of the satellite to nonuniform terrestrial traffic patterns by allocating time slots as needed. For channelization operation, however, frequency-hopping capability at the ground stations 16 is required. That is, over different parts of the TDMA frame, a given ground station may be required to transmit on different carrier frequencies. Again, simultaneous transmission on two or more channels is precluded.

The various component circuits of the satellites 12,14, such as the antenna feed network 22, the demodulator and regenerator 24, the multiplexer 26, the routing switches 30,46, the switch controller 32, the modulator 36, and the transmitter 38 are well known to those of ordinary skill in the art of satellite communications and are therefore not described in detail here.

MODE OF OPERATION

The above satellite system 10 can serve a wide terrestrial area with its multiple simultaneous spot-beams which totally reuse the frequency band. There are assumed to be M spot-beam subregions covering ground stations 16 which are to be interconnected. For a fixed beam satellite, M is on the order of perhaps 10 to 15, and there are then M simultaneous beams formed. Alternatively, for a multiple scanning spot-beam satellite such as the satellite 44 of FIG. 2, M may be on the order of 100, but only a small fraction of this number, e.g. 1/10, of simultaneous beams are formed. For either case, the system spot-beam-to-spot-beam traffic can be represented by the M×M traffic Matrix T:

$$T = \begin{matrix} t_{1,1} \cdots t_{1,M} \\ \vdots \\ t_{M,1} \cdots t_{M,M} \end{matrix} \quad (1)$$

where element $t_{i,j}$ represents the total traffic originating in spot-beam i destined for spot-beam j. It is noted that the traffic comprising each element in T may encompass many ground stations 16 per beam.

For the case where each satellite transmitter 38 occupies the entire bandwidth, it can be shown that call blockage occurs when either the traffic originating or destined to a given spot-beam region exceeds the capacity of a single transmitter 38 or the total offered traffic exceeds the total satellite 12,44 capacity. Moreover, when the total traffic is equal to the total satellite 12,44 capacity, each transmitter 38 is utilized with an efficiency of 100 percent. That is, a TDMA (Time-Division Multiple Access) time-slot assignment exists such that all time slots are used for each transmitter 38. For channelized operation, it is desirable that the trunking efficiency and the overall transmitter 38 utilization efficiency both be comparable to single wideband transmitter 38 operation.

Both large traffic and small traffic ground station users may be present in each spot-beam. A convenient method for accommodating both users simultaneously, without the need of the high volume users storing large numbers of bits prior to transmission, is to define a long time-period basic frame which repeats in a time which is short compared to the satellite path delay but is nevertheless sufficiently long to permit a large packet of bits for a single voice circuit. Within this basic frame high-volume users may repeat their transmissions several times. This increases the transmission rate for these users, yet does not require additional storage. Typical operation parameters for the system 10 are as follows:

Frame Time: 25 ms (milliseconds)

At least once every 25 ms a ground station 16 will transmit 800 bits of information (800 bit/25 ms=32 kb/s) plus 134 overhead bits, if it is in active communication with another ground station 16.

Subframe Time: 500 μs (microseconds)

Every 500 μs, the satellite routing switch 30,46 makes all possible connections among all uplink spot-beams 14 and downlink spot-beams 42 (12 spot-beams each way are used as typical).

Minimum Connection Time: 10.42 μs

This is the minimum time that the satellite routing switch 30,46 connects pairs of ground stations 16. This permits 48 time units to be divided among the 12 uplink spot-beams 14 and the downlink spot-beams 42, with the average connection time being 500/12=41.67 μs.

Bit Rates

Within the duration of the minimum connection time, there are defined eight time slots, each of which contains a voice circuit packet of 934 bits. The overall bit rate for a single high-speed channel is thus defined by $$\frac{934 \times 8}{10.4x} \frac{\text{bits}}{\mu s} = 717.3 \text{ Mb/s (megabits per second)}.$$

With a 500 MHz (megahertz) transmission bandwidth this requires a BTL (channel bandwidth times the inverse signalling rate) product of 1.39, which is reasonable. For parallel transmission, i.e., uplink frequency channels 18, the following bit rates and uplink power savings are possible:

| No. of Channels Per Beam | Bit Rate (Mb/s) | Power Saving (dB) |
|---|---|---|
| 1 | 717.3 | 0 |
| 2 | 358.6 | 3 |
| 4 | 179.3 | 6 |
| 8 | 89.6 | 9 |

Frame Repetition Rates

Since the satellite 12,44 repeats its switching sequences every 500 μs, the equivalent of 400 circuits can be time shared during the minimum connection time of 10.4 μs among the earth stations in that spot-beam. Time slots must be repeated every 25 ms for a voice circuit but may be repeated at submultiples up to as often as every 500 μs; this is equivalent to increasing the capacity. The table below illustrates packets which are conveniently available:

| Repeat Period | No. of VC (Voice Channels) (32 kb/s)/Channel | | | |
|---|---|---|---|---|
| | 8 Channels | 4 Channels | 2 Channels | 1 Channel |
| 25 ms | 1 | 2 | 4 | 8 |
| 5 | 5 | 10 | 20 | 40 |
| 2.5 | 10 | 20 | 40 | 80 |
| 1 | 25 | 50 | 100 | 200 |
| 0.5 | 50 | 100 | 200 | 400 |

Subframe length 10.4 μs

The above frame format permits 2, 4, and 8 frequency-divided channels. Using only 2 or 4 channels hardly seems worth the added complication to save only 3 or 6 dB respectively of uplink power. On the other hand, the framing format does not easily divide itself into creating 16 channels. Although the uplink power could, in principle, be reduced by 12 dB, the satellite becomes very complicated, requiring 192 receivers with detectors for a 12 beam system. While 8-way channelization with 96 uplink channels makes a relatively complex satellite, such a satellite system is nevertheless manageable. A factor of 8-power savings reduces a typical 200 watt earth station transmitter power requirement to 25 watts, thus potentially permitting the transition from high power traveling wave tubes to more economical and reliable solid-state devices for the uplink transmitter of the ground stations 16.

Fixed Spot-beam Considerations

Bit detection and regeneration is, as a practical matter, required for satellite configurations which employ on-board signal processing. Although one could imagine a nonregenerative satellite which processes frequency-divided uplinks and a single downlink transmitter for each beam, such an approach has several disadvantages, the chief of which is a requirement for a linear power amplifier. This problem is so serious that it would probably negate the advantages of the single wideband amplifier.

In the simplest form, the uplink frequency channels 18 are multiplexed in the satellite prior to the satellite switch 30, as shown in FIG. 1. The switch 30 in this drawing operates at baseband: however, a version in which intermediate frequency switching is employed could be made easily by placing the modulators 36 on the lefthand side of the routing switch 30. Frequency translation to RF (radio frequency) would probably be required on the downlink side of the routing switch 30, however. The arrangement of the satellite 12 simply mimics a configuration in which a single uplink channel is used per uplink spot-beam 14 and; under certain conditions, it can be made to have access capability equivalent to that of a single wideband channel. If ground station 16 are assigned, or can generate, only one of the uplink frequency channels 18, the access is considerably reduced as compared to the equivalent of a single high-speed uplink channel, as with the satellite 12. For single channel per beam operation, the interconnect time between the $i^{th}$ uplink beam and the $j^{th}$ downlink beam as represented in the above traffic matrix is proportional to element $t_{i,j}$. In principle, for 8 to 1 channelization, the interconnect time is again $t_{i,j}$ since the 8 parallel channels each operating at ⅛ the data rate require the same interconnect time as does a single channel operating at the full bandwidth data rate. However, since each ground station 16 can access only a single channel, the situation might arise wherein during a particular interconnect interval, a fraction greater than ⅛ of element $t_{i,j}$ may arise from ground stations 16 all assigned to the same channel. Should this happen, the interconnect time remains at the value required for single channel operation, and then some calls must necessarily be blocked. Alternatively, if the interconnect time is expanded to accommodate all the traffic originating from ground stations 16 assigned to a common channel, then the remaining seven channels are unused for a portion of the interconnect time, implying inefficient use of the capacity of the satellite 12. Thus, performance is degraded relative to single channel operation.

By way of example, in a subframe for a single uplink frequency channel 18, the ground stations 16 might share the equivalent of 400 voice circuits and any station 16 can access any of these circuits because all time-share a single channel. When eight channels are employed, only 50 circuits are available, presumably to ⅛ the number of ground stations 16. A consequence of this is that trunking efficiency is reduced because of the reduced number of channels. Another troublesome problem comes in accommodating high-data rate channels, such as would be used for a video signal service. If the minimum subframe time is all that is available between a particular pair of beams, then full use of one of the eight frequency divided channels is equivalent to only 1.6 Mb/s, barely a sufficient amount for a video circuit. Thus, if one station requires a video circuit it block all others from any service whatsoever to that particular beam if those stations 16 cannot access another channel.

If earth stations have the capability of generating additional channels, the system 10 approaches the access capability of a single channel. For the $i^{th}$ uplink beam to communicate via the $j^{th}$ downlink beam, the ground stations are assigned to channels such that each channel transmits ⅛ the traffic of $t_{i,j}$. By this it is assured that the i—j interconnect time is the shortest possible and is consistent with the interconnect time required for single channel operation. For communicating to the $k^{th}$ downlink beam, the ground stations 16 are reassigned to channels such that, again, each channel transmits ⅛ of the traffic $t_{i,k}$. By dynamic assigning of the ground stations 16 to channels, it is possible to balance the loading on each channel such that the interconnect time is minimized and the utilization efficiency of the satellite's capacity approaches that attainable for single channel operation. Simultaneous transmission of a given ground station 16 on two or more channels is avoided. Although this approach is superior to fixed channel assignment, inefficiencies will necessarily result because the number of ground stations 16 per beam is finite, and it may not always be possible to precisely partition the ground stations 16 into channel groups such that for each destination, the channel loading is always exactly uniform. Furthermore, if any one ground station 16 in beam i requires a fraction greater than ⅛ of a traffic entity $t_{i,j}$, then the minimum interconnect time must be extended, implying inefficiency, or else blockage will occur.

An alternate method to more efficiently accommodate channelized uplink operation is realized with the satellite 44 of FIG. 2. Here, the satellite routing switch 46 operates upon frequency channelized uplink spot-beams 14, and the multiplexing into high-speed serial downlink spot-beams 42 is performed after the routing. At first thought, this may seem impractical, considering the required large number of routing switch crosspoints (proportional to the square of the number of input terminals 28). However, the bit rate that must be passed through the crosspoints is reduced by a factor of 8 to 45 Mb/s (megabits per second). This assumes 4-phase modulation. Thus, the 90 Mb/s stream can be broken into two 45 Mbit/s rails and switched independently as required. At this relatively low bit rate, the technology for building the satellite switch 44 changes from exotic, custom high-speed logic to presently commercially available logic families which are, in many cases, space qualified.

For the post-switch multiplexer 48 of FIG. 2, any uplink channel 18 can access any multiplexer 48, and hence can access any downlink spot-beam 42. If a change is required, it merely calls for a reconfiguration of the satellite routing switch 46. All of the eight routing switch output terminals 34 connected to a multiplexer 48 go to the same destination, and any uplink channel 18 can access an output terminal 34 leading to any multiplexer 48 if the satellite routing switch 46 is configured nonblocking. The utility of this approach is examined below.

$$R_i = \sum_{j=1}^{M} t_{i,j} \quad (2)$$

$$S_j = \sum_{i=1}^{M} t_{i,j} \quad (3)$$

$R_i$ represents the total traffic arising from beam i. $S_j$ represents the total traffic terminating in beam j. Let it be assumed that the ground stations are partitioned in the $i^{th}$ beam such that each group contributes $R_i/D$ units of uplink traffic, where D is the number of uplink channels 18. For this partition, the destinations of the traffic arising at any ground station are not considered. Similarly, the ground stations in beam j are partitioned such that each group receives $S_j/D$ units of traffic. It is noted that $R_i \leq DC$, $S_j \leq DC$, where C is the capacity of a channelized transponder. A necessary condition for performing these partitions is that no ground station 16 communicates more than C units of traffic.

With this partitioning, a total of MD uplink channels and MD downlink channels are created. When these are numbered from 1 to MD, an MD×MD traffic or matrix T for them can be written as an MD×MD:

$$\tau = \begin{bmatrix} \tau_{1,1} & \cdots & \tau_{1,MD} \\ \vdots & & \vdots \\ \tau_{MD,1} & \cdots & \tau_{MD,MD} \end{bmatrix} \quad (4)$$

where element $\tau_{i,j}$ represents the traffic from channel i destined for channel j. The channels i and j may be in the same or different beams. Similarly, at the satellite 44, there exist D noninterfering channelized routing switch output terminals 34 for each of M noninterfering spot-beams, for a total of M×D×C units of available capacity. By construction, no row or column of (4) sums to more than C, and the total traffic does not exceed M×D×C. It is known to those in the art that it is always possible to efficiently assign the traffic of $\tau$ to the MD channelized transponders of the satellite. That is, a nonconflicting switching sequence exists for the MD×MD satellite which provides for 100 percent utilization efficiency of the satellite capacity. Thus, the efficiency and connectivity is the same as for single channel operation. Of course, the channelized outputs at the output terminals 34 of the satellite switch 46 are multiplexed into single high-speed serial downlink channel rails for the downlink spot-beam 42, as shown in FIG. 2.

Frequency hopping capability is not required for the system 10 with the satellite 12 of FIG. 1. For a given traffic matrix T, each ground station 16 is assigned to a particular high speed channel of a downlink spot-beam 42. However, since each uplink channel 18 now has ⅛ the capacity of a single wideband downlink channel, the trunking efficiency is somewhat reduced as compared against single channel operation, since a call can be blocked if the channel associated with that ground station is fully used. This is a minor effect, however, since for 8-channel operation, the circuits are bundled in groups of about 1250, compared against about 10,000 for single channel operation. Since the number of circuits in each bundle is large in both cases, the trunking efficiency is quite high. In any event, if frequency hopping is provided, then as T changes, ground stations 16 can be reassigned to different channels to efficiently accommodate the change. Thus, essentially the same trunking efficiency and transponder utilization efficiency as for a single operation can be obtained.

Scanning Spot-beam Considerations

The channelization concepts of the above discussion can be applied to multiple scanning beam satellite systems. From FIG. 1, it is noted that the antenna ports of either of the satellites 12,44 may be of the scanning type rather than being fixed spot-beam ports. The system traffic is then likewise given by (T), but the number of spot-beam regions is far greater than the number of simultaneous beams. As for fixed beam operation, if the ground stations in each spot-beam are partitioned into D fixed channel groups an inefficient design results. Alternatively, the spot-beam regions can be connected for the minimum interconnect time determined for single channel operation and frequency hopping capability can be provided at each ground station such that for each interconnect interval, the offered traffic is load balanced among the D channels. If the antenna ports of the satellite 44 are made scannable, frequency hopping capability at the ground stations is generally required. It was noted above that for $N=M$, an efficient TDMA assignment was possible, provided that no row or column T required more than DC units of capacity and the total offered traffic did not exceed $M \times D \times C$. For multiple scanning beams, $M >> N$. Each channel provides C units of capacity, there are D channels associated with each beam, and the number of simultaneous beams is N. Thus, the total system capacity is $N \times D \times C$. If for the traffic matrix T is as represented in formula (1) above, none of the M spot-beam earth regions requires more than DC units of capacity (DC is the capacity available for single channel operation) and the total offered traffic does not exceed $N \times D \times C$, then an efficient TDMA assignment is possible for multiple scanning beams with channelized uplinks.

For a multiple scanning beam system 10, T is decomposed into a cascade of matrices having at least one nonzero entry in each of N rows and N columns, and zero entries in all other rows and columns. These matrices are further characterized in that for each matrix, the row and column sums of the traffic are equal, although the common row and column sums for any one matrix need not equal that common sum for the remaining matrices. Should such a traffic matrix decomposition be possible, then for the $k^{th}$ matrix in the partition, the ground stations 16 are partitioned corresponding to the N uplink columns and N downlink rows having nonzero entries each summing to, for instance, $G_k$, into D groups such that each group contains $G_k/D$ units of traffic. For the $k^{th}$ matrix, the same conditions exist as for the fixed beam arrangement, and an efficient TDMA assignment (i.e., minimum interconnect time), for the traffic represented by the $k^{th}$ matrix results. Since the original traffic matrix T was decomposed into a cascade of matrices, each of which can be efficiently assigned, it follows that by cascading the assignments of each matrix comprising the partition, an overall efficient assignment is achieved. Since traffic from a given ground area footprint may be contained in more than one matrix and the channelized partitions may be different for different matrices, frequency hopping is generally required.

The original traffic matrix is characterized by the following constraints:

$$R_i = \sum_{j=1}^{M} t_{i,j} \leq DC \tag{5}$$

$$S_j = \sum_{i=1}^{M} t_{i,j} \leq DC \tag{6}$$

$$\sum_{i=1}^{M} R_i = \sum_{j=1}^{M} S_j = \sum_{i=1}^{M} \sum_{j=1}^{M} t_{i,j} \leq NDC \tag{7}$$

Hence, an N-tuple or diagonal of nonzero entries covering all rows and columns (if any) which sum to DC can always be found. For any such diagonal an $M \times M$ matrix with nonzero entries only in the N rows and N columns spanned by the diagonal by assigning traffic from the corresponding elements of T in such a way that the row and column sums of the newly formed matrix are equal, and that this common value, $Q_1$, is as large as possible subject to the constraint that $$DC - Q_1 \geq U_1 \tag{8}$$

where $U_1$ is the greatest sum of any row or column not spanned by the newly formed matrix. Inequality (8) states that the unused capacity of the satellite 44 subsequent to assignment of all the traffic of the newly formed matrix must be greater than the traffic requirement of any spot-beam footprint not having contributed any traffic to the newly formed matrix. This condition assures that, after subtracting the traffic of the newly formed matrix from T, a diagonal of the reduced matrix exists such that the decomposition can proceed. This procedure is iterated until T has been completely decomposed. For the $k^{th}$ iteration, inequality (8) must be replaced by $$DC - \sum_{n=1}^{k} Q_n \geq U_k \tag{9}$$

For examle, assuming there are $M=3$ spot-beam regions, and $N=2$ beams can be simultaneously formed, the band is split into $D=2$ equal channels, each of capacity $C=40$ time slots. The spot-to-spot traffic matrix and a possible decomposition into a cascade of six matrices with nonzero entries in only two rows and columns is shown in Table 1.

TABLE 1

$$T = \begin{bmatrix} 20 & 4 & 16 \\ 8 & 4 & 8 \\ 8 & 4 & 8 \end{bmatrix} \begin{matrix} 40 \\ 20 \\ 20 \end{matrix} = \begin{bmatrix} 8 & 0 & 8 \\ 0 & 0 & 0 \\ 8 & 0 & 8 \end{bmatrix} \begin{matrix} 16 \\ 0 \\ 16 \end{matrix} + \begin{bmatrix} 12 & 4 & 8 \\ 8 & 4 & 8 \\ 0 & 4 & 0 \end{bmatrix} \begin{matrix} 24 \\ 20 \\ 4 \end{matrix}$$
$$\begin{matrix} 36 & 12 & 32 \end{matrix} \quad\quad \begin{matrix} 16 & 16 \end{matrix} \quad\quad \begin{matrix} 20 & 12 & 16 \end{matrix}$$

TABLE 1-continued $$= \begin{bmatrix} 8 & 0 & 8 \\ 0 & 0 & 0 \\ 8 & 0 & 8 \end{bmatrix} + \begin{bmatrix} 6 & 0 & 6 \\ 6 & 0 & 6 \\ 0 & 0 & 0 \end{bmatrix} \begin{matrix} 12 \\ 12 \\ \end{matrix} + \begin{bmatrix} 6 & 4 & 2 \\ 2 & 4 & 2 \\ 0 & 4 & 0 \end{bmatrix} \begin{matrix} 12 \\ 8 \\ 4 \end{matrix}$$
$$\phantom{=\begin{bmatrix}8&0&8\end{bmatrix}}\begin{matrix}\phantom{0}12\phantom{00}12\end{matrix}\phantom{+\begin{bmatrix}6&0&6\end{bmatrix}}\begin{matrix}8\phantom{0}12\phantom{0}4\end{matrix}$$

$$= \begin{bmatrix} 8 & 0 & 8 \\ 0 & 0 & 0 \\ 8 & 0 & 8 \end{bmatrix} + \begin{bmatrix} 6 & 0 & 6 \\ 6 & 0 & 6 \\ 0 & 0 & 0 \end{bmatrix} + \begin{bmatrix} 4 & 2 & 0 \\ 2 & 4 & 0 \\ 0 & 0 & 0 \end{bmatrix} \begin{matrix} 6 \\ 6 \\ \end{matrix} + \begin{bmatrix} 2 & 2 & 2 \\ 0 & 0 & 2 \\ 0 & 4 & 0 \end{bmatrix} \begin{matrix} 6 \\ 2 \\ 4 \end{matrix}$$
$$\phantom{xxxxxxxxxxxxxxxxxxxxxxxxxxxxxxxx}\begin{matrix}6\phantom{0}6\end{matrix}\phantom{xxxxx}\begin{matrix}2\phantom{0}6\phantom{0}4\end{matrix}$$

$$= \begin{bmatrix} 8 & 0 & 8 \\ 0 & 0 & 0 \\ 8 & 0 & 8 \end{bmatrix} + \begin{bmatrix} 6 & 0 & 6 \\ 6 & 0 & 6 \\ 0 & 0 & 0 \end{bmatrix} + \begin{bmatrix} 4 & 2 & 0 \\ 2 & 4 & 0 \\ 0 & 0 & 0 \end{bmatrix} + \begin{bmatrix} 0 & 0 & 2 \\ 0 & 0 & 0 \\ 0 & 2 & 0 \end{bmatrix} \begin{matrix} 2 \\ \\ 2 \end{matrix} + \begin{bmatrix} 2 & 2 & 0 \\ 0 & 0 & 2 \\ 0 & 2 & 0 \end{bmatrix} \begin{matrix} 4 \\ 2 \\ 2 \end{matrix}$$
$$\phantom{xxxxxxxxxxxxxxxxxxxxxxxxxxxxxxxxxxxxxxxxxxxxxxxxxxx}\begin{matrix}2\phantom{0}2\end{matrix}\phantom{xxxxx}\begin{matrix}4\phantom{0}4\phantom{0}2\end{matrix}$$

$$= \begin{bmatrix} 8 & 0 & 8 \\ 0 & 0 & 0 \\ 8 & 0 & 8 \end{bmatrix} + \begin{bmatrix} 6 & 0 & 6 \\ 6 & 0 & 6 \\ 0 & 0 & 0 \end{bmatrix} + \begin{bmatrix} 4 & 2 & 0 \\ 2 & 4 & 0 \\ 0 & 0 & 0 \end{bmatrix} + \begin{bmatrix} 0 & 0 & 2 \\ 0 & 0 & 0 \\ 0 & 2 & 0 \end{bmatrix} + \begin{bmatrix} 2 & 0 & 0 \\ 0 & 0 & 0 \\ 0 & 2 & 0 \end{bmatrix} + \begin{bmatrix} 0 & 2 & 0 \\ 0 & 0 & 2 \\ 0 & 0 & 0 \end{bmatrix}$$

It is noted for each matrix in the decomposition, the rows and columns sum to the same number, and condition (9) is satisfied.

The time interval for which the third matrix of the decomposition is serviced is now considered. During this interval, two uplink beams (from Spots 1 and 2) are connected to two downlink beams (by coincidence, again to Spots 1 and 2). If Spot 1 is assumed to contain three ground stations labeled $g_{1,1}$, $g_{1,2}$, and $g_{1,3}$ and Spot 2 is assumed to contain two ground stations labeled $g_{2,1}$ and $g_{2,2}$, then of the six traffix units arising in Spot 1 for this interval, three units are contributed by $g_{1,1}$, two by $g_{1,2}$, and one by $g_{1,3}$. Thus, for this interval, $g_{1,1}$ is assigned to Channel 1 and $g_{1,2}$ and $g_{1,3}$ are assigned to Channel 2. Of the six traffic units arising during this interval in Spot 2, three are contributed by $g_{2,1}$ and three by $g_{2,2}$. Thus, for this interval, we assign $g_{2,1}$ to Channel 1 and $g_{2,2}$ to Channel 2. Similarly, for the downlink of Spot 1, three units are intended for $g_{1,1}$ and arrive on Channel 1 and the two units for $g_{1,2}$, as well as the one unit for $g_{1,3}$ arrive on Channel 2. For Spot 2, three units arrive on Channel 1 for $g_{2,1}$ and three units arrive on Channel 2 for $g_{2,2}$. A channelized traffic matrix $S_3$ for this time interval might then appear as follows:

|  |  | Spot 1 | | Spot 2 | |
|---|---|---|---|---|---|
|  |  | Channel 1 | Channel 2 | Channel 1 | Channel 2 |
| $S_3 =$ | Spot 1 Channel 1 | 1 | 0 | 1 | 1 |
|  | Spot 1 Channel 2 | 0 | 1 | 1 | 1 |
|  | Spot 2 Channel 1 | 1 | 1 | 1 | 0 |
|  | Spot 2 Channel 2 | 1 | 1 | 0 | 1 |

For this matrix, it is noted that each row and column sums to three units and the total traffic contained is 12 units. Three units of traffic are budgeted for each of four channelized uplinks to accommodate this traffic. An assignment is assured. By following established traffic assignment procedures for this type of problem, the interconnection sequences performed by the satellite switch are arrived at as shown in Table 2:

TABLE 2

| UpLink | Spot 1, Channel 1 | | |
|---|---|---|---|
| Downlink | Spot 1 Channel 1 | Spot 2 Channel 1 | Spot 2 Channel 2 |
| UpLink | Spot 1, Channel 2 | | |
| Downlink | Spot 1 Channel 2 | Spot 2 Channel 2 | Spot 2 Channel 1 |
| UpLink | Spot 2, Channel 1 | | |
| Downlink | Spot 2 Channel 1 | Spot 1 Channel 1 | Spot 1 Channel 2 |
| UpLink | Spot 2, Channel 2 | | |
| Downlink | Spot 2 Channel 1 | Spot 1 Channel 1 | Spot 1 Channel 2 |

The multiplexers then combine the two channels for Spot 1 and the two channels for Spot 2 into two high-speed serial rails.

Time-division assignments to the satellite switch for each of the remaining matrices formed by decomposing T can similarly be made. Thus, it is possible to utilize the capacity resources of the satellite with an efficiency approaching that of single channel operation. Finite granularity in assigning ground stations to channel groups for each matrix in the decomposition might, however, prevent attainment of 100 percent utilization efficiency.

What is claimed is:

1. A communications system of the type including a plurality of accessing and receiving ground stations which communicate with each other via a satellite, the satellite comprising:

means for receiving a plurality of digital uplink signals from the accessing ground stations, the uplink signals being received as a plurality of equal bandwidth spot-beams which each comprise a plurality of frequency-divided uplink channels;

means for demodulating and regenerating the received uplink signals;

means for routing the demodulated and regenerated signals between a set of input terminals and a set of output terminals to generate corresponding downlink signals;

means for modulating and amplifying the downlink signals, and means for transmitting the downlink signals to the receiving ground stations, characterized by means for multiplexing the signals after regeneration to form high bit rate serial downlink signals as a plurality of equal-bandwidth downlink spot-beams equal to the number of uplink spotbeams, which downlink spotbeams each comprise at least one downlink frequency channel, there being a greater number of frequency-divided uplink channels per uplink spot-beam than there are downlink frequency channels per downlink spot-beam.

2. The system according to claim 1 wherein the downlink signals are transmitted as a plurality of spotbeams which each comprise only a single downlink frequency channel, the downlink frequency channel having a bandwidth equal to the combined bandwidth of the frequency-divided uplink channels in an uplink spot-beam.

3. The system according to claim 2 wherein the means for multiplexing are arranged to multiplex the uplink signals after they are regenerated and before they pass to the means for routing.

4. The system according to claim 2 wherein the means for multiplexing are arranged to multiplex the uplink signals after they are routed to the output terminals and before they pass to the means for modulating.

5. The system according to claims 3 or 4 wherein the means for routing is capable of being dynamically reconfigured in accordance with the instantaneous signal traffic demand for the satellite.

* * * * *